United States Patent
González Alonso

(10) Patent No.: US 12,378,942 B2
(45) Date of Patent: Aug. 5, 2025

(54) ENERGY STORAGE SYSTEM

(71) Applicant: Gestigas S.L., Madrid (ES)

(72) Inventor: Ignacio González Alonso, Madrid (ES)

(73) Assignee: Gestigas S.L., Madrid (ES)

( * ) Notice: Subject to any disclaimer, the term of this patent is extended or adjusted under 35 U.S.C. 154(b) by 0 days.

(21) Appl. No.: 18/840,555

(22) PCT Filed: Feb. 22, 2023

(86) PCT No.: PCT/ES2023/070098
§ 371 (c)(1),
(2) Date: Aug. 22, 2024

(87) PCT Pub. No.: WO2023/161549
PCT Pub. Date: Aug. 31, 2023

(65) Prior Publication Data
US 2025/0154927 A1 May 15, 2025

(30) Foreign Application Priority Data
Feb. 25, 2022 (ES) ................. ES202230154

(51) Int. Cl.
*F03B 17/02* (2006.01)
*F03G 3/00* (2006.01)

(52) U.S. Cl.
CPC ............ *F03B 17/025* (2013.01); *F03G 3/094* (2021.08); *F05B 2220/706* (2013.01);
(Continued)

(58) Field of Classification Search
CPC ........ F03G 3/00; F03G 3/094; F05B 2260/42; F05B 2220/706; F05B 2240/931;
(Continued)

(56) References Cited

U.S. PATENT DOCUMENTS 6,933,624 B2 * 8/2005 Beaston ................ F03B 17/025
290/43
7,656,051 B2 * 2/2010 Perin ..................... F03B 17/025
290/43

(Continued)

FOREIGN PATENT DOCUMENTS

GB 2596284 12/2021
WO WO 2012/034104 3/2012
WO WO 2016/040746 3/2016

OTHER PUBLICATIONS

International Search Report.

*Primary Examiner* — Jesse S Bogue
(74) *Attorney, Agent, or Firm* — Dunlap, Bennett & Lodwig PLLC

(57) ABSTRACT

An energy storage system (1), which comprises a weight (2) hanging from a cable (3, 10) connected to a first rotation shaft (5) mechanically coupled to a second rotation shaft (6) of a motor-generator assembly (7) connected to the power grid. When there is a surplus of electrical energy in the grid, the motor-generator (7) consumes energy, operating as a motor to rotate the first shaft (5) in a winding direction of the cable (3, 10), whereas, when there is a shortage of electrical energy in the grid, the motor-generator (7) supplies energy, operating as a generator utilising the rotation of the first shaft (5) in an unwinding direction of the cable (3, 10) when the free fall of the weight (2) is allowed. When the weight (3) is displaced immersed in water, in addition a compressed-air system can be utilised to modify the buoyancy of the weight.

17 Claims, 5 Drawing Sheets

(52) U.S. Cl.
CPC ... *F05B 2240/931* (2013.01); *F05B 2260/422* (2020.08); *F05B 2260/602* (2013.01)

(58) Field of Classification Search
CPC .......... F05B 2260/422; F05B 2260/602; F03B 13/10; F03B 13/1815; F03B 17/025; B63B 22/00; B63B 22/18; F04F 5/10
See application file for complete search history.

(56) References Cited

U.S. PATENT DOCUMENTS

| | | | |
|---|---|---|---|
| 10,259,543 B2* | 4/2019 | Stevens .................. | F03B 13/10 |
| 10,605,226 B2* | 3/2020 | Sheldon-Coulson ... | B63B 35/44 |
| 10,669,998 B2* | 6/2020 | Stevens .................. | F03G 3/094 |
| 2009/0193808 A1* | 8/2009 | Fiske ..................... | F03D 13/40 |
| | | | 290/1 R |
| 2012/0112472 A1* | 5/2012 | Murray ............... | F03B 13/1845 |
| | | | 290/1 R |
| 2016/0032887 A1* | 2/2016 | Patton ................ | F03B 13/1865 |
| | | | 60/504 |
| 2016/0040645 A1* | 2/2016 | Perez .................... | F03G 3/094 |
| | | | 185/32 |

* cited by examiner

ENERGY STORAGE SYSTEM

BACKGROUND OF THE INVENTION

The present invention relates to the field of energy generation and storage.

The object of this invention is a new energy storage system based upon the transformation of electrical energy into potential energy and vice versa by displacing weights in the vertical direction.

It is well known that electrical energy is not usually stored as such in high amounts. Therefore, it is required to adapt the production to the consumption in real time. To this, predictive systems designed for estimating in advance the electrical energy demanded at each time according to a set of variables such as the day of the week, the time of the day, the temperature, the cloudiness, etc. are utilised. However, since not every electrical power generating plant is flexible to increase or reduce its power production at will, and given that predictions on demand are only approximate, there are moments throughout the day when the generated energy is higher or lower than the demanded energy. This is currently of a particular importance since renewable energies are becoming more and more important.

To mitigate this problem, different systems are known, which allow the electrical energy generated when there is a surplus production to be transformed into other types of energy capable of being stored such as potential energy. When there is an energy shortage in the grid, that stored energy is transformed into electrical energy again, which is injected into the grid.

The known most commonly employed storage systems are pump storage stations. A pump storage station utilises a reservoir containing water dammed at a higher level than a lower reservoir to pump said water to the first dammed-water reservoir through a duct when there is an energy surplus in the grid. At a later moment, when there is an energy shortage in the grid, the water is caused to flow down through the duct to flow through turbines and generate electrical energy.

Furthermore, it is known to store electrical energy transforming it into chemical energy by means of batteries and the like. However, these solutions are not developed entirely yet and are expensive and excessively contaminating.

For this reason, there is currently a great interest in this technical field in developing new storage systems that allow electrical energy surpluses to be transformed and stored for their further utilisation in shortage situations.

SUMMARY OF THE INVENTION

The present invention describes a new storage system for electrical energy in the form of potential energy, which is based upon causing one or more weights to rise or fall along a large height.

In fact, it is well known that the potential energy is determined by the formula $E=mgh$, wherein E is the energy, m is the mass of the weight, g is the acceleration of gravity, and h is the height of the displacement. Then, considering a weight amounting to, for example, 100 tonnes displaced along a height of 100 metres, it is obtained that the potential energy that can accumulate amounts to 27 Kwh. If a system comprising a number of weights higher than one, for example, 100 weights, is considered, it follows that the maximum total amount of energy that could accumulate in said system would amount to 2.7 Mwh.

The energy storage system of this invention utilises this storage capacity in such a manner that, when it is required to store the excess energy in the grid, said excess energy is employed to hoist a weight up to a determined height, whereas, when it is required to supply energy to the grid, the energy generated by causing the weight to fall from that height is utilised to generate electrical energy. As it will be described below in detail, this storage system is particularly useful when the weights are displaced being immersed in water, since it makes it possible to influence the buoyancy of the weights to improve the performance of the system.

In this document, the term "vessel" should be interpreted as making reference to any floating structure, including not only actual ships but also floating platforms such as oil platforms or any other kind of platform.

In this document, the term "cable" should be interpreted as making reference to any type of line from which the weights can hang, including strings, ropes, chains, mooring ropes, threads, etc. These lines can be made of any material and by means of any process.

Energy Storage System

A first aspect of the present invention relates to an energy storage system comprising at least one weight hanging from at least one cable connected to a first rotation shaft. The connection between the cable and the first rotation shaft can be implemented in different ways provided that the rotation of said shaft in a first direction of rotation causes the cable to be wound, thereby causing the weight to rise, and that the fall of the weight causes the rotation of the shaft in a second direction of rotation opposite to the first direction. For example, the first rotation shaft could comprise a capstan around which the cable is wound. Alternatively, for example if the cable is a chain, the cable could be hooked in the first shaft by means of a toothed wheel in such a manner that each tooth engages a link. In essence, different implementation options are possible.

In any case, the above-mentioned first rotation shaft is mechanically coupled to a second rotation shaft of a motor-generator assembly connected to the power grid. Again, the mechanical connection between the first shaft and the second shaft can be implemented in any manner, it being even possible that the first shaft and the second shaft be constituted by a sole common shaft. In any case, the underlying concept is that, since they are coupled mechanically, the rotation of one shaft is transmitted to the other shaft automatically. Then, when the cable is unwound as the free fall of the weight is allowed, the rotation of the first shaft is transmitted to the second shaft. This allows the motor-generator to utilise said rotation operating as a generator to generate power. Similarly, when the motor-generator operates as a motor, the rotation it causes to the second shaft is transmitted to the first shaft so that the first shaft picks up the weight by causing it to rise.

Between the first shaft and the second shaft there can be optionally additional auxiliary components such as a reduction gear that adapts the rotation speed of the first shaft to a suitable speed for the operation of the motor-generator or a mechanical decoupling means of the shafts. The system may further include a spool placed next to the first shaft to store the excess cable. Herein below, a full description of an example including some of these auxiliary elements is provided.

Furthermore, the system of the invention comprises a blocking means configured to block the fall of the weight selectively. This blocking means could be implemented in very different ways, for example by means of a retainer or a pin that avoids the rotation of the first shaft. This element could be actuated manually in a direct manner, or remotely by means designed to that effect. In any case, regardless of the particular implementation, this element will make it possible to block or allow the natural fall of the weight to leave if hanging at the desired height.

This structure allows, by winding and unwinding the cable around the first shaft, the weight to alternate between an upper position and a lower position. The top and the lower position can be any position provided that the upper position is located higher than the lower position, although the larger the difference in height between the upper position and the lower position is, the higher the storage capacity of the system will obviously be. Therefore, the system of the invention can operate such that:

When there is a surplus of electrical energy in the grid, the motor-generator consumes energy, operating as a motor to rotate the first shaft in a winding direction of the cable to hoist the weight in the direction towards the upper position.

When there is a shortage of electrical energy in the grid, the motor-generator supplies energy, operating as a generator to utilise the rotation of the first shaft in an unwinding direction of the cable that occurs when the free fall of the weight is allowed in the direction towards the lower position.

This configuration is advantageous since it makes it possible to store the excess energy from the grid to utilise the same at a later time when needed in a quick and simple manner.

The system of the invention can be implemented in very different manners depending on each application. In preferred configurations of the invention, the system could be implemented ashore. As an example, one or several wells in the ground could be utilised, along which the weight or weights are displaced, for example in abandoned mines or the like. Alternatively, it would also be possible to build or re-utilise a tower high enough the top end of which the weight or weights could hang from.

However, it is particularly advantageous to implement the system of the invention in such a manner that the weight or weights be immersed in water along substantially the entire path between the top and the lower position. In fact, if the weight is immersed, the performance of the system can be increased by modifying the buoyancy of the weight or weights to increase it when they rise (then reducing the amount of energy consumed) and to reduce it when they fall (then increasing the amount of energy obtained). For example, the modification of the buoyancy of the weight or weights can be achieved if the weights comprise a compressed-air reservoir and a water reservoir so that the water reservoir is filled with water when the weight falls but which, when rising, is filled with air coming from the compressed-air reservoir.

More specifically, a preferred embodiment of the invention relates to an energy storage system comprising a vessel in which the above-mentioned elements, i.e., the first rotation shaft, the second rotation shaft and the motor-generator, are installed. In this way, a path of the weight between the upper position and the lower position when the cable is wound or unwound is immersed in the water. Furthermore, the weight comprises a ballast, a water reservoir and a compressed-air reservoir in this particular configuration. This system is configured such that:

When the motor-generator operates as a motor to consume power causing the weight to rise in the direction towards the upper position, the water is drained from the water reservoir by feeding compressed air coming from the compressed-air reservoir. The replacement of water by air in the water reservoir leads to an increased buoyancy and, therefore, to a diminished energy required to lift the same.

When the motor-generator operates as a generator to generate power allowing the weight to fall in the direction towards the lower position, the water reservoir is filled with water. The feeding of water into the water reservoir leads to a reduction in buoyancy and, therefore, to an increased energy obtainable as it is caused to fall.

Obviously, for the system to be able to operate in this manner, it is required that the pressure of the air stored in the compressed-air reservoir be higher than the pressure of the water at the maximum operating depth corresponding to the lower position since the compressed air could not otherwise cause the water stored in the water reservoir to be drained. Therefore, in this implementation of the system of the invention, it will be necessary to make a prior calculation of the pressure at the maximum operating depth and to have the required elements for the air being fed into the compressed-air reservoir to be at a higher pressure. In addition, in this configuration it is possible to utilise the situations with an excess energy in the grid to carry out an air compression, which will be utilised to modify the buoyancy of the weight.

This configuration is particularly advantageous since it allows to increase the performance of the energy storage system. Indeed, when the water in the water reservoir is replaced by compressed air, the buoyancy of the weight is increased to a large extent. Therefore, the energy required to cause it to rise is reduced in the energy consumption stages. Moreover, by a suitable design of the system, it would even be possible to achieve that the compressed air compensates the mass of the weight almost completely so that it is hardly necessary to employ energy so as to cause it to rise. Similarly, as the water reservoir is filled, the buoyancy of the weight is reduced to a large extent. Therefore, the amount of energy obtained as the fall of the same is allowed is increased in the energy generation stages.

In principle, the ballast, the water reservoir and the compressed-air reservoir can have different relative positions in the weight of the invention provided that they allow the described operating procedure to be performed. In particular, according to a particularly preferred embodiment of the invention, the ballast is located in a lower portion of the weight, the water reservoir is located in an intermediate portion of the weight and the compressed-air reservoir is located in an upper portion of the weight. These particular positions have several advantages. Since the ballast is located in the lower portion of the weight, the stability of the weight is increased. Furthermore, the arrangement of the compressed-air reservoir in the upper portion of the weight facilitates the access to said compressed-air reservoir to fill it when the weight is located in the upper position. It is also advantageous that the water and the compressed-air reservoir are contiguous since this facilitates the flowing of the compressed air from the compressed-air reservoir to the water reservoir.

In order to operate the system of the invention as described, different openings are required in the weight, particularly in the water reservoir and in the compressed-air reservoir, to allow both reservoirs to be filled with water or compressed air or emptied, as appropriate. Obviously, each of the openings will also have an associated valve designed to allow the opening to be opened or closed when appropriate during the operation of the system of the invention. Although the number, configuration and position of these openings may vary according to each particular application of the system of the invention, a particular embodiment of the present invention is described subsequently, in which the weight comprises:

- A first compressed-air filling opening arranged in the compressed-air reservoir in communication with the outside. The function of this opening will be to allow the compressed-air reservoir to be filled when the weight is located in the upper position. To facilitate the connection of a duct connected to a compressor or a compressed-air reservoir, this first opening can be located in an upper area of the compressed-air reservoir. Then, in the event that the weight, in its upper position, is located out of the water partially, precisely the upper portion of the compressed-air reservoir would project such that the first opening be exposed for the connection of the compressed-air supply line. This first filling opening can have a closing valve that prevents compressed air from flowing out selectively, either manually or automatically.
- A second exhaust opening arranged in an upper portion of the water reservoir in communication with the outside. The function of this opening will be allowing air to flow out of the water reservoir as said reservoir is being filled with water when the weight is located in the upper position. Furthermore, in the event that the air stored in the water reservoir when the weight reaches the upper position is still compressed (this will happen when the third water inlet/outlet opening has remained closed during the rise of the weight, as described below), it would be possible to recover this compressed air instead of allowing it to escape to the atmosphere freely. To this, when the weight reaches its upper position, the second exhaust opening would be connected to a compressed-air reservoir. The second opening can have a closing valve that avoids the opening selectively such that it is closed during the operation of the system and only opens during the filling operations of the water reservoir with water, normally when the weight is located in the upper position. This valve could be actuated manually in a direct manner or, alternatively, the operation of this valve can be remote by suitable means.
- A third water inlet/outlet opening arranged in a lower portion of the water reservoir in communication with the outside. The function of this opening will be allowing water to flow out of the water reservoir when the weight is located in the lower position as well as allowing water to flow into the water reservoir when the weight is located in the upper position. To this, in a particularly preferred embodiment of the invention, the third opening comprises a tipping valve located on its internal side and equipped with a float. By this configuration, when the water reservoir is filled with water during the path between the upper position and the lower position, the float keeps the valve open due to the buoyancy. When the water reservoir is filled with compressed air coming from the compressed-air reservoir when the lower position is reached, the weight of the valve itself causes it to close. The valve is kept closed provided that the pressure of the compressed air inside the water reservoir is higher than the water pressure in the outside. This condition is met during the entire rising path of the weight until reaching the upper position. The external pressure is higher than the internal pressure only when, in the upper position, the exhaust opening opens and the compressed air escapes from the water reservoir. At that moment, the higher external pressure causes the valve to open and the water floods the reservoir again. The valve, due to the buoyancy, is kept open as long as the reservoir is still filled with water.
- A fourth air inlet opening arranged between the compressed-air reservoir and the water reservoir. The function of this opening will be to allow the compressed air to flow into the water reservoir coming from the air reservoir. Preferably, the fourth opening can feature a pressure valve configured to open when the pressure in the water reservoir reaches a predetermined value normally corresponding to the depth of the lower position. Therefore, when the weight reaches the lower position, the pressure of the water contained in the reservoir (it should be kept in mind that the third opening is open during the entire falling path of the weight) is the pressure corresponding to said depth. This causes the pressure valve of the fourth opening to open and, therefore, the feeding of compressed air into the water reservoir. The water from the water reservoir is drained through the third opening until the reservoir is filled only with air. At that moment, the valve of the third opening closes.

In principle, the ballast can be formed just by the walls of the weight themselves, but it is preferably a reservoir taking up a relevant portion of the interior volume of the weight and which is filled with a suitable material such as concrete or the like. Particularly, in a particularly preferred embodiment of the invention, the ballast is a sand-filled reservoir.

This configuration is particularly advantageous since the sand is a clean material that does not generate an environmental impact if, due to an emergency, the ballast needs to be emptied onto the seabed.

On the other hand, although the weight may adopt very different configurations provided that it includes the elements described so far, two particularly advantageous configurations are described herein in detail. In a first configuration, the weight has such a size and shape that it can pass through vertical openings drilled into the hull of the vessel to reach an upper position in which it projects partially above the sea level. In a second configuration, the weight has such a size and shape that, in the upper position, it projects partially above the sea level on both sides of the vessel. Both configurations have advantages and drawbacks described below.

FIRST EMBODIMENT

In this first embodiment, the vessel has a hull comprising at least one vertical opening the top end of which is located above the waterline of the vessel. That is to say, the vertical opening has a substantially cylindrical shape with its top edge located at a higher height than the waterline to prevent water from flowing into the hull. The weight hangs through said vertical opening, i.e., the cable passes through the vertical opening.

In principle, the vertical openings of the hull of the vessel could have such dimensions that only the cable from which the weights hang can pass through the same. In that case, the upper position of the weights would be located immediately under the hull of the vessel and, for this reason, the weights would be immersed entirely even in the upper position. This would make the operation and maintenance tasks of the system more complicated, which would need the help of divers or robotised systems to be carried out. To avoid this drawback, in a particularly preferred embodiment of the invention, the cross section of the vertical opening is larger than the cross section of the weight. In this manner, in the upper position, the upper portion of the weight is located above the waterline. That is to say, the size of the vertical opening is such that the weight can pass through the same and, in this manner, it can reach an upper position in which it projects at least partially above the sea level. Therefore, when it is located in the upper position, the upper portion of the weight is exposed into the hull from the top edge of the opening, thereby facilitating the operation and maintenance tasks of the system. For example, this would facilitate the connection of a compressed-air duct to the first opening to fill the compressed-air reservoir.

In a particularly preferred embodiment, the weight is cylindrical in shape with rounded ends. Obviously, in this case the vertical openings in the hull of the vessel would be normally cylindrical too but having a somewhat larger radius than that of the weight. This shape of the weight has the additional advantage that the friction with water during the weight displacement between the top and the lower position is reduced, and the disadvantage of the reduction of the vessel tonnage and, therefore, of its load capacity.

SECOND EMBODIMENT

In this second embodiment, the weight is U-shaped, the width of the U being larger than a beam of the vessel, and hangs from additional cables connected to ends of arms in the U. Said additional cables can be fixed to cranes or arms protruding laterally from the beam of the vessel. In this manner, in the upper position of the weight, the ends of the arms in the U are located above the waterline, thereby facilitating the operation and maintenance tasks of the system. In addition, this configuration can comprise at least one cable passing through a vertical opening in the hull of the vessel (an opening like the one described above with respect to the second configuration) and which is connected to a basis of the U.

According to a particularly preferred embodiment, the weight further comprises two compressed-air reservoirs located at the ends of the arms in the U.

On the other hand, although the system of the invention can be formed by just one weight hanging from just one cable in its easiest version, it is obvious that it will preferably include a plurality of weights hanging from respective cables to increase its storage capacity. Since these weights will be subjected to different forces caused by the currents and the rotation of the Earth, oscillations will occur the trajectory of which is difficult to predict and, in absence of a system that avoids it, the entangling of the cables of the different weights will be highly likely. For this reason, in a particularly preferred embodiment of the invention, the system comprises a plurality of weights the cables of which are connected to each other by means of rigid connections to prevent the cables from entangling with one another. Since they are rigid, these connections keep the distance between the cables relative to each other and, therefore, between the weights relative to each other. Furthermore, these rigid connections will be able to slide along the cables in such a manner that they do not condition the different height positions of the weights.

In another preferred embodiment of the invention, the system further comprises an automatic device for cutting the cable configured to cut the cable in case of emergency. The weights would therefore fall onto the seabed, from which they could eventually be recovered. In this case, according to another preferred embodiment, the system further comprises a tracer arranged in each weight, which will allow the weight to be located on the seabed in the event that the cable is cut. It would also be possible that the weights have in their lower part, i.e., the lower wall of the ballast, hatches allowing the ballast to be emptied so as to help rescue the weights.

Procedure for Operating an Energy Storage System

A second aspect of the present invention relates to a procedure for operating an energy storage system. The storage system comprises a weight hanging from at least one cable connected to a first rotation shaft mechanically coupled to a second rotation shaft of a motor-generator assembly connected to the power grid. Therefore, the weight can alternate between an upper position and a lower position. Then, the procedure comprises essentially the following steps:

When there is a surplus of electrical energy in the grid, operating the motor-generator as a motor to actuate the first shaft in a winding direction of the cable to hoist the weight in the direction towards the upper position.

When there is a shortage of electrical energy in the grid, allowing the free fall of the weight in the direction towards the lower position and utilising the rotation of the first shaft in an unwinding direction of the cable to operate the motor-generator as a generator.

In a preferred embodiment, the system comprises a vessel in which the first rotation shaft, the second rotation shaft and the motor-generator are installed. In this manner, a path of the weight between the upper position and the lower position when the cable is wound or unwound is immersed in water. The weight further comprises a ballast, a water reservoir and a compressed-air reservoir. In this case, the procedure for operating the system comprises the following steps:

When the motor-generator operates as a motor to consume power causing the weight to rise in the direction towards the upper position, the water is drained from the water reservoir by feeding compressed air coming from the compressed-air reservoir.

When the motor-generator operates as a generator to generate power allowing the weight to fall in the direction towards the lower position, the water reservoir is filled with water.

In a further preferred embodiment, the weight comprises: a first compressed-air filling opening arranged in the compressed-air reservoir in communication with the outside; a second exhaust opening arranged in an upper portion of the water reservoir in communication with the outside; a third water inlet/outlet opening arranged in a lower portion of the water reservoir in communication with the outside; and a fourth air inlet opening arranged between the compressed-air reservoir and the water reservoir. In this case, the procedure comprises the following steps:

When the weight is located in the upper position, filling the compressed-air reservoir with compressed air through the first opening and filling the water reservoir with water through the third opening while keeping the second opening open. Obviously, during this entire process, the fourth opening is closed, and the second opening closes once the water reservoir is filled with water entirely or sufficiently filled according to the calculations of the final design.

Once the second opening is closed, allowing the free fall of the weight towards the lower position to generate electrical energy by means of the motor-generator operating as a generator. During the fall, the third opening can be kept open for the pressure inside the water reservoir to be kept at all times equalised with the external pressure. Given that the feeding of water into the water reservoir has led to a reduction in the buoyancy of the weight, a higher amount of energy is obtained.

When the weight is located in the lower position, filling the water reservoir with compressed air through the fourth opening draining the water through the third opening. Subsequently, once the water reservoir is filled with air, the third opening can be closed.

Hoisting the weight towards the upper position consuming electrical energy by means of the motor-generator operating as a motor. During this entire time lapse, the third opening can be kept closed. Since the drainage of the water stored in the water reservoir has increased the buoyancy of the weight, the consumed amount of energy is much lower.

DETAILED DESCRIPTION OF THE INVENTION

Several exemplary preferred embodiments of this invention are described below with reference to the attached figures.

Figure 1:
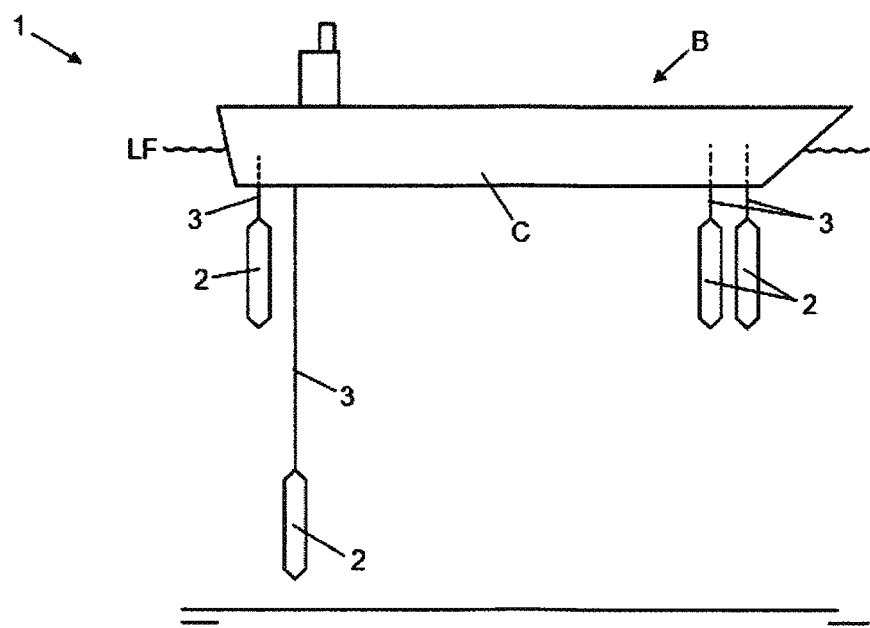
FIG. 1 shows a schematic side view of an exemplary system according to the present invention.
Figure 2:
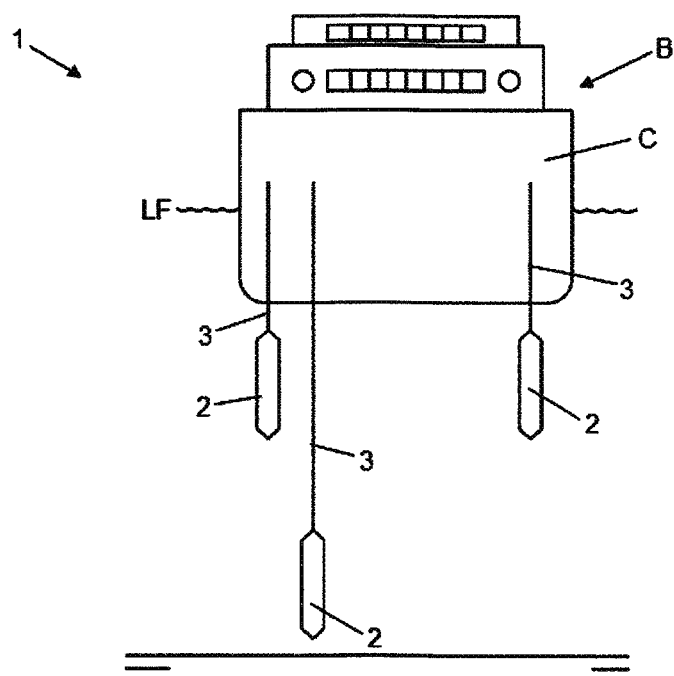
FIG. 2 shows a schematic rear elevational view of the exemplary system according to the present invention.

FIGS. 1 and 2 show two views of an exemplary energy storage system (1) installed in a vessel (B). As it can be seen, the system (1) comprises a plurality of weights (2) hanging from respective cables (3). Despite not being shown in detail in these figures, each of the cables (3) hangs from a suitable element arranged inside the hull (C) of the vessel (B) and passes through a respective opening (8) of said hull (C). Despite not being shown in detail in these figures, the openings (8) will be cylindrical in shape, the top end of which is located at a higher height than the waterline (LF) of the vessel (B).

Thanks to this configuration, when there is an energy surplus in the power grid, this energy can be utilised to hoist the weights (2) from a lower position up to an upper position, which can be located under the hull (C) of the vessel (B) or above the waterline (LF), passing through the openings, as described below in detail.

The energy that could be stored by such a system (1) will be estimated subsequently. To make the calculations, a Panamax merchant vessel (B) having a 296 m length and 32 m beam (width) at most is considered. If a weight (2) is hung each 16 m², 530 weights could be hung. Assuming that each weight (2) is a cylinder with an immersed net weight of 100 tonnes and that the length of the cable (3) or, more precisely, the difference between the first height and the second height, amounts to 600 metres, it is obtained that the potential energy that could accumulate with just one weight would amount to 163 Kwh. Multiplying by 530, a maximum total amount of 86.4 Mwh stored potential energy is obtained. The total weight of the system would be 53,000 Tn, which corresponds approximately to the load limit of this vessel model.

Figure 3:
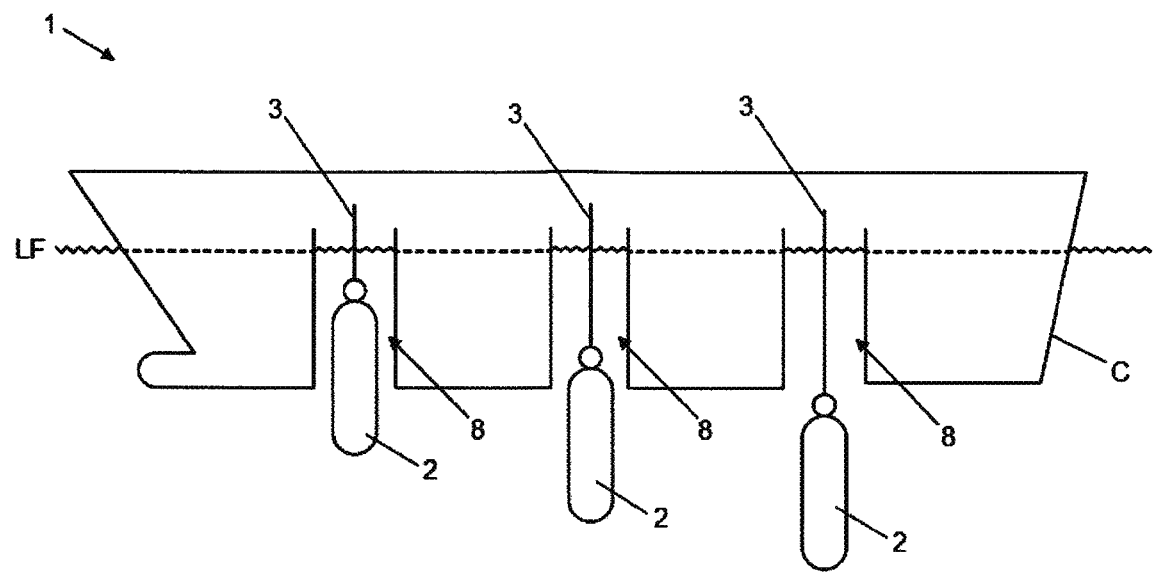
FIG. 3 shows a schematic cross section of the exemplary system according to the present invention.

FIG. 3 shows this exemplary storage system (1) in greater detail. As it can be seen, the openings (8) in the hull (C) of the vessel (B) have a cylindrical shape the top edge of which is located at a higher height than the waterline (LF) of the vessel (B) to contain the water to prevent this from flooding the inside of the hull (C) of the vessel (B). Furthermore, in this example the diameter of the openings (8) is larger than the diameter of the weights (2) such that these can reach up to an upper position through said openings (8) in which at least their upper portion projects above the waterline (LF). As it will be explained below, this is advantageous to facilitate the operation and maintenance tasks of the system of the invention.

Figure 4:
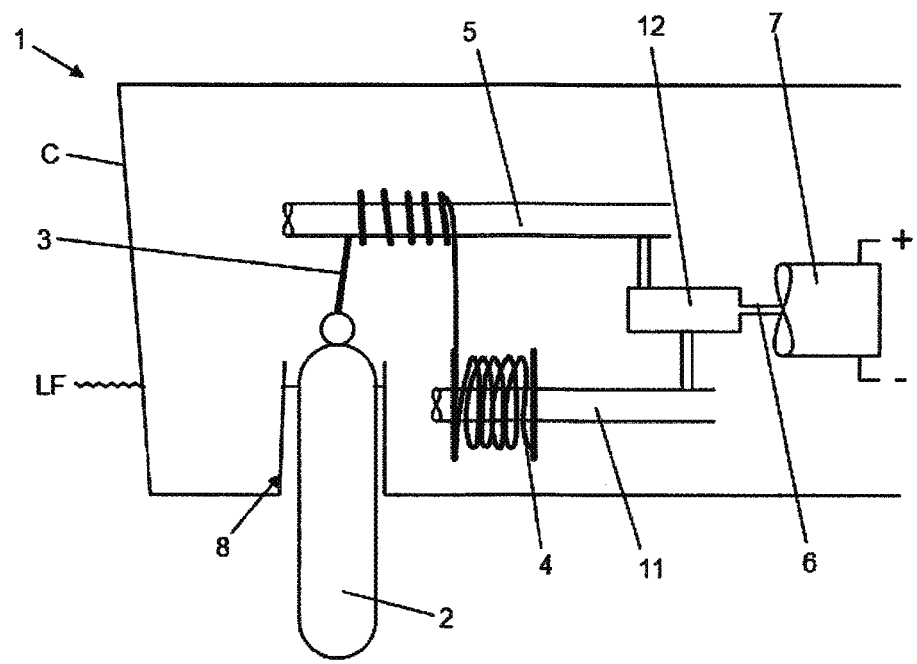
FIG. 4 shows a more detailed cross section of the exemplary system according to the present invention.

FIG. 4 shows the different elements this exemplary system (1) according to the invention is composed of. As it can be seen, the cable (3) which the weight (2) hangs from passes through the opening (8) up the first shaft (5), which is a capstan in this example. From the capstan, the cable (3) passes to a spool (4) that rotates around a third shaft (11). The first shaft (5) is coupled mechanically to a second shaft (6) by means of a reduction gear (12), and the second shaft (6) is connected to a motor-generator (7) electrically connected to the power grid. The mechanical connection between the first shaft (5) and the second shaft (6) is such that the rotation of any of them implies the rotation of the other one. This means that the first shaft (5) may be a drive shaft dragging the second shaft (6), or the second shaft (6) may be the drive shaft dragging the first shaft (5). Furthermore, the reduction gear (12) comprises a mechanical connection with the third shaft (11), the shaft of the spool (4), to guarantee a suitable synchronisation between said third shaft (11) and the first shaft (5) so that the spool (4) rolls up/down the cable (3) in a coordinated manner with the operation of the capstan.

Here, the opening (8) has a diameter slightly larger than the weight (2), which is cylindrical too and with rounded edges to reduce the resistance exerted by the water during its vertical displacement between the lower position and the upper position. By this configuration, in the upper position shown in FIG. 4, the weight (2) passes through the opening (8) until it projects partially above the sea level corresponding to the waterline (LF) of the vessel (B).

Figure 5:
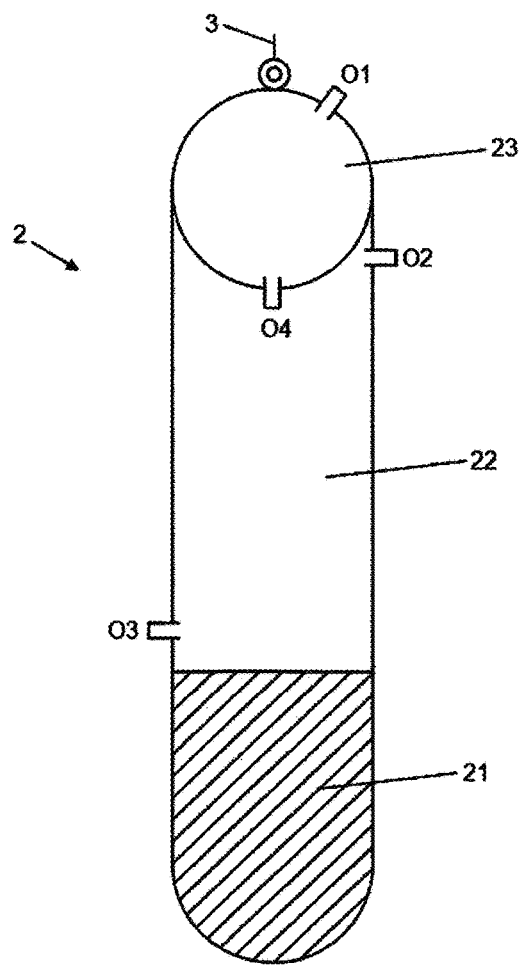
FIG. 5 shows a section view of the cylindrical weight utilised in the exemplary system according to the invention.

FIG. 5 shows in greater detail the internal configuration of the cylindrical weight (2) with rounded edges. The weight (2) is divided internally into three main parts: a ballast (21), a water reservoir (22) and a compressed-air reservoir (23). The ballast (21) is located in the lower portion of the weight (2) and, in this example, it comprises a sand-filled reservoir. The compressed-air reservoir (23) is located at the top end of the weight (2) and is presented spherical to better withstand the pressures which it will be subjected to during its shelf life, although it can be cylindrical in shape like a canister. The water reservoir (22) is placed between the two preceding reservoirs (21, 23).

In addition, the weight (2) comprises a set of openings (O1, O2, O3, O4) arranged in the water reservoir (22) and the compressed-air reservoir (23) to allow water or air to flow into and out of them during the operation of the system (1). Obviously, each of these openings (O1, O2, O3, O4) comprises a suitable valve that allows the opening and closing times to be controlled. Subsequently, the openings (O1, O2, O3, O4) comprised by the exemplary weight (2) shown in FIG. 5 are described.

First opening (O1): This is an opening located in the upper portion of the compressed-air reservoir (23), which communicates the interior of said reservoir (23) with the outside of the weight (2) to allow the same to be refilled. The compressed-air reservoir (23) will be refilled when the weight (2) is located in its upper position. In the example described herein, in the upper position, the weight (2) projects above the sea level through the opening (8) into the hull (C) of the vessel (B), in such a manner that a compressed-air reservoir and a compressor can be easily available inside the vessel (B) and a duct can be easily connected to the first opening (O1) when the compressed-air reservoir (23) needs to be refilled. The valve of this first opening (O1) can be actuated manually or automatically.

Second opening (O2): This is an exhaust opening located in the upper portion of the water reservoir (22), which communicates the interior of said reservoir (22) with the outside of the weight (2) to allow air to flow out of said reservoir (22) when the water filling operation is being carried out. This second opening (O2) can have a valve that is actuated manually or automatically, which only opens when said filling operation is carried out.

Third opening (O3): This is an opening located in the lower portion of the reservoir (22), which communicates the interior of said reservoir (22) with the outside of the weight (2) to allow water to flow into and out of said reservoir (22). Specifically, when the reservoir (22) is refilled with water in the upper position, the corresponding valve needs to keep the third opening (O3) open and, when the reservoir (22) has been refilled with compressed air completely, said valve needs to be closed. Although this operation can be achieved by means of an automatic valve in communication with a control centre, it is possible to design an autonomous automatic valve (V3). This valve (V3) shall be described below with reference to FIG. 6.

Fourth opening (O4): This is an opening communicating the interior of the water reservoir (22) with the interior of the compressed-air reservoir (23) to allow the compressed air to flow into the water reservoir (22) during the water drainage operation from said reservoir (22). To this, the fourth opening (O4) may have a pressure valve that only allows the compressed air to flow through from the reservoir (23) to the reservoir (22) when the pressure in the water reservoir (22) reaches a predetermined value corresponding to the depth of the lower position. That is to say, in this configuration the water reservoir (22) is opened during the entire falling path of the weight (2) from its upper position to the lower position such that the pressure inside the same corresponds to the pressure inside the sea at the corresponding depth. Then, the valve of the fourth opening (O4) can be configured such that, when a certain depth is reached at which the pressure inside the water reservoir (22) reaches a predetermined value, it opens and allows compressed air to flow in. Alternatively, the valve of the fourth opening (O4) could be in communication with a control centre to be operated remotely.

Figure 6:
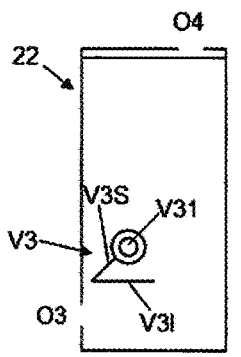
FIG. 6 consists of FIGS. 6A, 6B, 6C, and 6D and show several views of the operation of a mechanical valve arranged in the third opening in the weight according to the invention.
Figure 6:
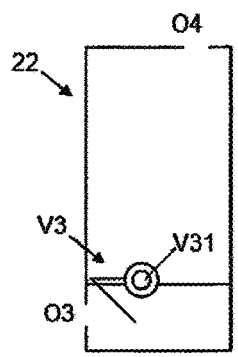
Figure 6:
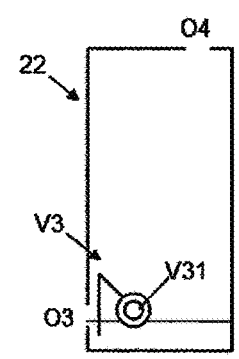
Figure 6:
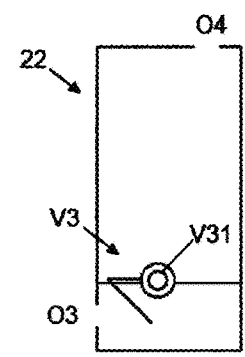

FIG. 6 shows an exemplary valve (V3) for the third opening (O3), which is designed such that it opens and closes when required to operate the system (1) of the invention. Communication means for it to be operated remotely from a control centre are thereby not required. The valve (V3) is formed by arms connected to each other such that an angle is formed. At the end of one of the arms, named here upper arm (V3S), there is a float (V31), for example, a cylindrical float. The other arm will be named here lower arm (V3I). The connection between both arms (V3S, V3I) is fixed to a rotating connection just above the inner wall of the water reservoir (22). In this manner, when the valve (V3) is so arranged that the lower arm (V3I) is in a vertical position leaning against said inner wall, a sealing element of said lower arm (V3I), not explicitly shown in the figures, closes the opening (O3). When the valve (V3) rotates up to a position in which the lower arm (V3I) is inclined with respect to the inner wall and is not leaning any more against the same, the opening (O3) is opened, water being allowed to flow into/out of the reservoir (22).

With this configuration, the system (1) of the invention can be operated without any remotely actuatable valves being required, as described below. The starting point is the upper position in which the weight (2) is a similar position to that shown in FIG. 4 (hoisted, on top). In this situation, the water reservoir (22) is filled with water. The second opening (O2) is closed. This operation could have been performed manually since the top end of the weight (2) projects above the water. The first opening (O1) is closed too. This operation could be manual as well for the same reasons. The fourth opening (O4) is closed too since, if a pressure valve is utilised, the pressure inside the water reservoir (22) has not reached the predetermined opening pressure yet. Lastly, the third opening (O3) is open as it is shown in FIG. 6a. In fact, as the water reservoir (22) is filled with water, the float (V31) of the valve (V3) generates a vertical force and upwards causing the valve (V3) to rotate about the articulation in the anti-clockwise direction.

In this situation, the system (1) is operated such that the weight (2) falls up to the lower position with the objective to utilise the rotation of the first shaft (5) to, through its transmission to the second shaft (6), generate electrical energy by means of the motor-generator (7). The valve (V3) is kept open during the entire falling path since the float (V31) keeps on being immersed. Furthermore, due to the fact that the valve (V3) is open, the pressure inside the water reservoir (22) corresponds during the entire fall to the pressure at the depth at which the weight (2) is. As a consequence thereof, the pressure inside the water reservoir (22) increases as the weight (2) falls until, when the weight (2) reaches the lower position, the pressure in the water reservoir (22) reaches the predetermined value at which the valve of the fourth opening (O4) opens. At that time, compressed air starts to flow into the water reservoir (22), and the water starts to flow out through the third opening (O3). As the water level in the water reservoir (22) falls, the valve (V3) rotates about the articulation, as it can be seen in FIG. 6, so that the lower arm (V3I) gets closer and closer to the inner wall of the reservoir (22). When the water inside the water reservoir (22) has reached a sufficiently low level, as it is shown in FIG. 6c, the lower arm (V3I) of the valve (V3) closes the third opening (O3).

In this situation, with the valve (V3) of the third opening (O3) being closed and the water reservoir (22) being filled with compressed air, the weight (2) is kept in the lower position until there is excess energy in the grid or it is decided to hoist the same utilising the increased buoyancy obtained. To this, a suitable blocking means can be utilised to prevent the weight (2) from keeping on falling. When there is excess energy in the grid that can be utilised to hoist the weight, the motor-generator (7) is actuated as a motor, the rotation of the second shaft (6) causes the first shaft (5) to rotate, and the weight (2) starts to fall from its lower position as the cable (3) is wound on the capstan. During the rising path of the weight (2), the third valve (V3) is kept closed since, in addition to this, the pressure of the compressed air inside the water reservoir (22) is higher than the pressure of the water outside the weight (2) at all times. Therefore, the weight rises up to the upper position in which it projects partially above the sea level through the openings (8) in the hull (C) of the vessel (B).

Once located in the upper position, the water reservoir (22) is refilled with water. To this, the valve of the second exhaust opening (O2) is opened. As already mentioned herein, the second opening (O2) can be opened either remotely or manually. The compressed air inside the water reservoir (22) can be just exhausted to the atmosphere or, alternatively, it can be recovered being led to a compressed-air reservoir arranged in the vessel (B). In any case, when the compressed air flows out, the pressure inside the water reservoir (22) is reduced and, as a consequence thereof, there is a time when the water pushing from the outside causes the valve (V3) to rotate and, consequently, to open, as it is shown in FIG. 6d. The water starts to flood the water reservoir (22) until filling it completely. To return to the initial situation of this process, in addition it can be necessary to refill the compressed-air reservoir (23). To this, a compressed-air duct can be connected to the first opening (O1) manually. Furthermore, it will be necessary to close the exhaust valve of the second opening (O2).

This operating mode of the energy storage system (1) of the invention can be carried out by utilising weights (2) different in shape. To obviate the need for the vessel (B) to have large openings (8) in its hull (C) but, at the same time, to make sure that the weight (2) projects in its upper position above the sea level so as to facilitate the operation of the system (1), it is possible to utilise a U-shaped weight (2).

Figure 7:
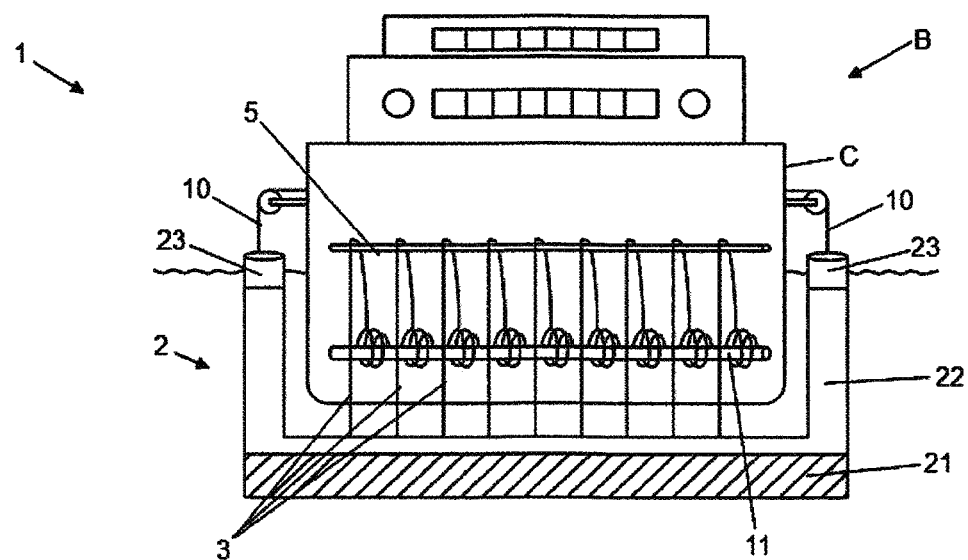
FIG. 7 shows a rear view of another exemplary system according to the invention with an alternative configuration of the weight being U-shaped.

FIG. 7 shows an exemplary system (1) according to the invention, wherein the weight (2) is U-shaped. As it can be seen, the U-shaped weight (2) is formed by a horizontal basis from which two vertical arms extend perpendicularly. The length of the basis is larger than the beam of the vessel (B) and the length of the arms is larger than the draught of the vessel (B). In this way, when the weight (2) reaches an upper position in which the top surface of the basis of the U is adjacent to the lower part of the hull (C) of the vessel (B), the ends of the arms project above the sea level. This allows the valves of the first and the second opening (O1, O2) to be actuated easily, similarly to how it was described above.

Furthermore, it can be observed in FIG. 7 that the U-shaped weight (2) hangs from a plurality of cables (3, 10). A first subset of cables (3) are arranged similarly to how they are with the cylindrical weights (2) shown in preceding figures. These are cables (3) anchored to the basis of the U-shaped weight (2), which extend through the hull (C) through openings (8) drilled into the same (obviously, these openings (8) will have a top edge above the waterline (LF) of the vessel (B)). A second subset of cables (10) hang from cranes or arms protruding from the beam of the vessel (B) and extending vertically in parallel to the gunwale of the vessel (B) until they are connected to the weight (2) at the ends of the arms in the U. The connection of all of these cables (3, 10) to the first shaft (5) can be realised in different ways and by employing movement transmission shafts and mechanisms in different configurations.

Figure 8:
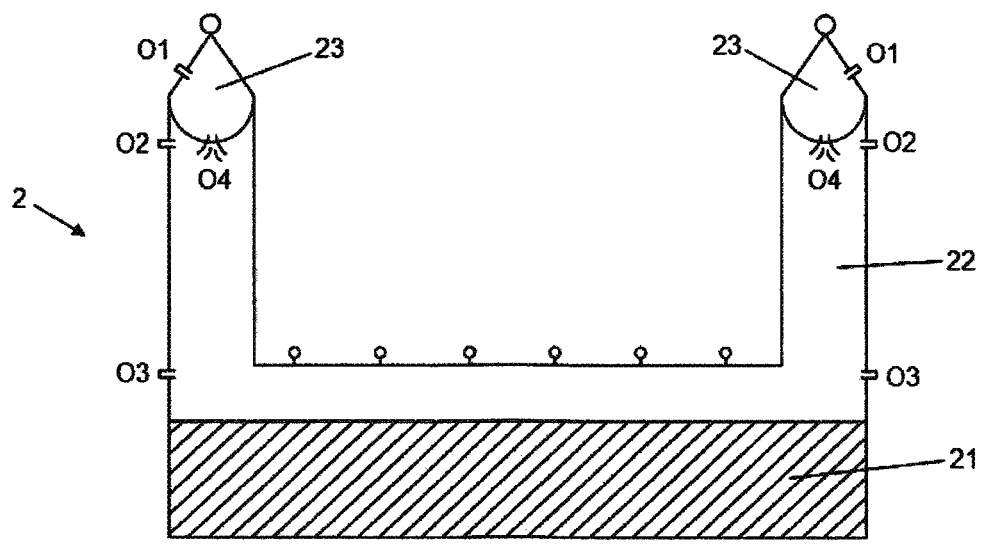
FIG. 8 shows the alternative configuration of the U-shaped weight in greater detail.

FIG. 8 shows in greater detail the internal configuration of the U-shaped weight (2) shown in FIG. 7. As it can be seen, like the cylindrical weight (2) described above, the U-shaped weight (2) has three differentiated parts: a ballast (21), located in the lowest part of the basis of the U-shaped weight (2); a water reservoir (22), taking up most part of the volume of both arms of the U-shaped weight (2); and a compressed-air reservoir (23), taking up the part of the top end of the arms of the U-shaped weight (2). The operation of these elements is similar to that of the cylindrical weight described above.

Figure 9:
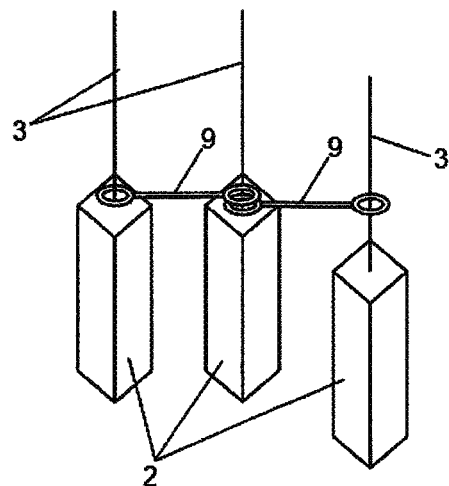
FIG. 9 shows exemplary rigid connections between weights with the first cylindrical configuration.
Figure 10:
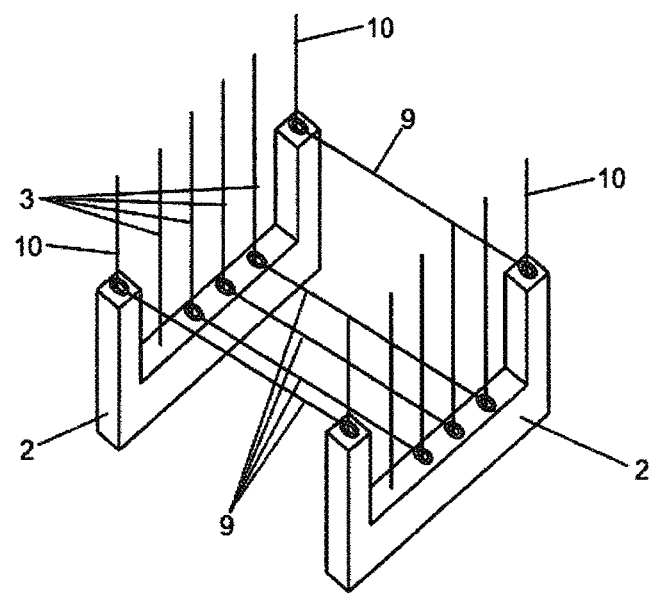
FIG. 10 shows exemplary rigid connections between weights with the second U-shaped configuration.

FIGS. 9 and 10 show the arrangement of a set of rigid connections (9) between the cables (3, 10) which the weights (2) hang from to prevent them from entangling with one another during the operation of the system (1) of the invention.

In particular, FIG. 9 shows the arrangement of the rigid connections (9) when weights (2) with the shape of a square-section prism are utilised. In this context, it is to be understood that, when cylindrical weights (2) are mentioned herein, it is also possible that the weight is prismatic with a different cross section such as square, pentagonal, hexagonal or others. Similarly, the references made to the rounded ends of the cylindrical weights (2) should be further understood as applicable to other aerodynamic shapes formed by curved or flat surfaces such as a pyramidal shape. The rigid connections (9) are connected to each cable (3) by means of sliding connections along the cable (3) itself. In this manner, the weights (2) can be lifted and lowered independently of one another.

On the other hand, FIG. 10 shows the rigid connections (9) utilised if several U-shaped weights (2) are utilised, which would be distributed along the length of the vessel (B). In this case, rigid connections (9) would be utilised not only between pairs of cables (3) connected to the basis of the U but also between pairs of cables (10) connected to the ends of the U. In this context, it is to be understood that the pair of a cable (3, 10) connected to a U-shaped weight (2) is that cable (3) connected in an equivalent position to a contiguous weight (2) arranged in parallel to the first one.

The invention claimed is:

1. An energy storage system, which comprises a vessel in which a first rotation shaft is installed, to which a cable is connected from which a weight hangs, mechanically coupled to a second rotation shaft of a motor-generator assembly connected to a power grid in such a manner that, by winding and unwinding the cable around the first shaft, the weight can alternate between an upper position and a lower position, a path of the weight between the upper position and the lower position being immersed in water, wherein the energy storage system is configured that:
   when there is a surplus of electrical energy in the power grid, the motor-generator consumes energy, operating as a motor to rotate the first shaft in a winding direction of the cable to hoist the weight in the direction towards the upper position and,
   when there is a shortage of electrical energy in the power grid, the motor-generator supplies energy, operating as a generator utilising the rotation of the first shaft in an unwinding direction of the cable that occurs when a free fall of the weight is allowed in the direction towards the lower position,
wherein
the weight comprises a ballast, a water reservoir, and a compressed-air reservoir, the energy storage system being configured such that:
  when the motor-generator operates as a motor to consume power causing the weight to rise in the direction towards the upper position, water is drained from the water reservoir by feeding compressed air coming from the compressed-air reservoir to increase the buoyancy of the weight; and
  when the motor-generator operates as a generator to generate power allowing the weight to fall in the direction towards the lower position, the water reservoir (22) is filled with water to reduce the buoyancy of the weight.

2. The energy storage system according to claim 1, wherein the ballast is located in a lower portion of the weight, the water reservoir is located in an intermediate portion of the weight and the compressed-air reservoir is located in an upper position of the weight.

3. The energy storage system according to claim 1, wherein the weight further comprises:
  a first compressed-air filling opening arranged in the compressed-air reservoir in communication with the outside;
  a second exhaust opening arranged in an upper portion of the water reservoir in communication with the outside;
  a third water inlet/outlet opening arranged in a lower portion of the water reservoir in communication with the outside; and
  a fourth air inlet opening arranged between the compressed-air reservoir and the water reservoir.

4. The energy storage system according to claim 3, wherein the third water inlet/outlet opening comprises a tipping valve located on an internal side of the water reservoir and equipped with a float so that, when the water reservoir is filled with water, the float keeps the tipping valve open, whereas, when the water reservoir is filled with air, the weight thereof causes the valve to close provided that pressure outside the water reservoir is lower than the pressure inside the water reservoir.

5. The energy storage system according to claim 3, wherein the fourth air inlet opening comprises a pressure valve configured to open when the pressure in the water reservoir reaches a predetermined value.

6. The energy storage system according to claim 1, wherein the ballast is a sand-filled reservoir.

7. The energy storage system according to claim 1, wherein the vessel comprises a hull comprising at least one vertical opening a top end of which is located above a waterline of the vessel, the cable which the weight hangs from passing through the vertical opening.

8. The energy storage system according to claim 7, wherein a cross section of the vertical opening is larger than a cross section of the weight in such a manner that, in the upper position, an upper portion of the weight is located above the waterline.

9. The energy storage system according to claim 7, wherein the weight is cylindrical in shape with rounded ends.

10. The energy storage system according to claim 1, wherein the weight is at least one U-shaped weight, a width of the U-shaped weight being larger than a beam of the vessel, the weight hanging from additional cables connected to ends of arms of the U-shaped weight in such a manner that, in the upper position of the weight, ends of the arms of the U-shaped weight are located above the waterline.

11. The energy storage system according to claim 10, which further comprises at least one cable passing through a vertical opening in the hull of the vessel and connected to the U-shaped weight.

12. The energy storage system according to claim 10, wherein the weight comprises two compressed-air reservoirs located at ends of the arms of the U-shaped weight.

13. The energy storage system according to claim 1, wherein there are a plurality of weights cables of which are connected to each other by means of rigid connections to prevent the cables from entangling with one another, wherein the rigid connections are able to slide along the cables.

14. The energy storage system according to claim 1, which further comprises an automatic device for cutting the cable in case of emergency.

15. The energy storage system according to claim 14, which further comprises a tracer configured to locate the weight in the event that the cable is cut.

16. A procedure for operating an energy storage system, which comprises a vessel in which a first rotation shaft is installed mechanically coupled to a second rotation shaft of a motor-generator assembly connected to a power grid in such a manner that a weight can alternate between an upper position and a lower position, wherein a path of the weight between the upper position and the lower position is controlled by a cable when it is wound or unwound and the weight is immersed in water, which comprises the following steps:
  when there is a surplus of electrical energy in the power grid, operating the motor-generator assembly as a motor to actuate the first rotation shaft in a winding direction of the cable to hoist the weight in the direction towards the upper position, and
  when there is a shortage of electrical energy in the power grid, allowing free fall of the weight in the direction towards the lower position taking advantage the rotation of the first rotation shaft in an unwinding direction of the cable to operate as a generator of the motor-generator assembly,
  wherein the weight comprises a ballast, a water reservoir and a compressed-air reservoir so that, when the motor-generator assembly operates as a motor causing the weight to rise in a direction towards the upper position, water is drained from the water reservoir by feeding compressed air coming from the compressed-air reservoir; and
  when the motor-generator assembly operates as a generator to generate power by allowing the weight to free fall in the direction towards the lower position, the water reservoir is filled with water.

17. The procedure for operating an energy storage system according to claim 16, when the weight has a first compressed-air filling opening arranged in the compressed-air reservoir in communication with the outside; a second exhaust opening arranged in an upper portion of the water reservoir in communication with the outside; a third water inlet/outlet opening arranged in a lower portion of the water reservoir in communication with the outside; and a fourth air inlet opening arranged between the compressed-air reservoir and the water reservoir, comprises the following steps:
  when the weight is located in the upper position, filling the compressed-air reservoir with compressed air through the first opening and filling the water reservoir with water through the third opening while keeping the second opening open;

closing the second opening and allowing the free fall of the weight towards the lower position to generate electrical energy by means of the motor-generator assembly operating as a generator;

when the weight is located in the lower position, filling the water reservoir with compressed air through the fourth opening draining the water through the third opening; and hoisting the weight towards the upper position consuming electrical energy from of the motor-generator assembly operating as a motor.

* * * * *